United States Patent [19]

Yoshida et al.

[11] 4,184,192
[45] Jan. 15, 1980

[54] SOLID ELECTROLYTE COMPACITOR USING LOW RESISTIVITY METAL OXIDE AS CATHODE COLLECTOR

[75] Inventors: Akihiko Yoshida; Atsushi Nishino, both of Kadoma, Japan

[73] Assignee: Matsushita Electric Industrial Co., Ltd., Osaka, Japan

[21] Appl. No.: 877,839

[22] Filed: Feb. 15, 1978

[30] Foreign Application Priority Data

| Feb. 15, 1977 | [JP] | Japan | 52-15655 |
| Feb. 24, 1977 | [JP] | Japan | 52-20017 |
| Mar. 18, 1977 | [JP] | Japan | 52-30931 |

[51] Int. Cl.$^2$ .................... H01G 9/00; B01J 17/00
[52] U.S. Cl. .................... 361/433; 252/514; 29/570
[58] Field of Search .................... 361/433; 252/514; 29/570

[56] References Cited

U.S. PATENT DOCUMENTS

| 3,461,355 | 8/1969 | Fry | 361/433 |
| 3,531,693 | 9/1970 | Buice | 361/433 |
| 3,644,795 | 2/1972 | Taguchi | 361/433 |
| 3,711,385 | 1/1973 | Beer | 252/514 |
| 3,801,479 | 4/1974 | Nishino et al. | 361/433 |
| 3,843,400 | 10/1974 | Radford et al. | 252/514 |
| 3,881,957 | 5/1975 | Hausler | 361/433 |
| 3,920,452 | 11/1975 | Davies | 252/514 |
| 4,020,401 | 4/1977 | Cannon et al. | 29/570 |

FOREIGN PATENT DOCUMENTS 7146412  8/1972  France ................ 361/433

Primary Examiner—Andrew J. James
Attorney, Agent, or Firm—Lowe, King, Price & Becker

[57] ABSTRACT

A solid electrolyte capacitor which utilizes a semiconductive metal oxide such as manganese dioxide as solid electrolyte can be improved particularly in its dielectric loss and frequency-capacitance characteristics by the use of an oxide of Ru, Rh, Pd, Re, Os and/or Ir as a material of a cathode collector layer covering the solid electrolyte layer either in place of or together with colloidal carbon which is used commonly. It is preferable that a conductive layer formed on the cathode collector layer is a plasma-sprayed coating of a metal such as copper.

19 Claims, 10 Drawing Figures

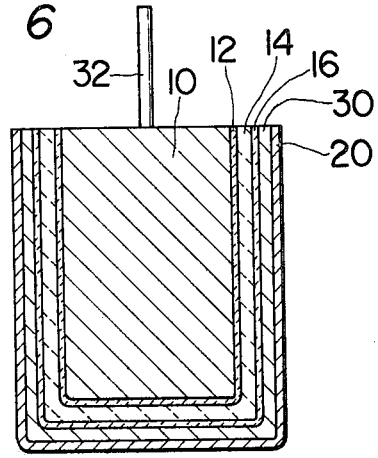
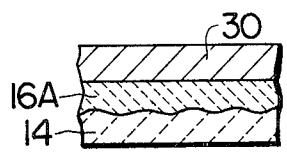 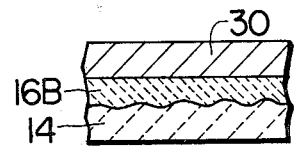 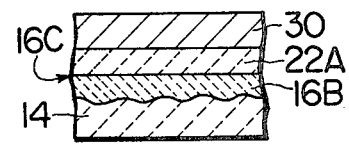
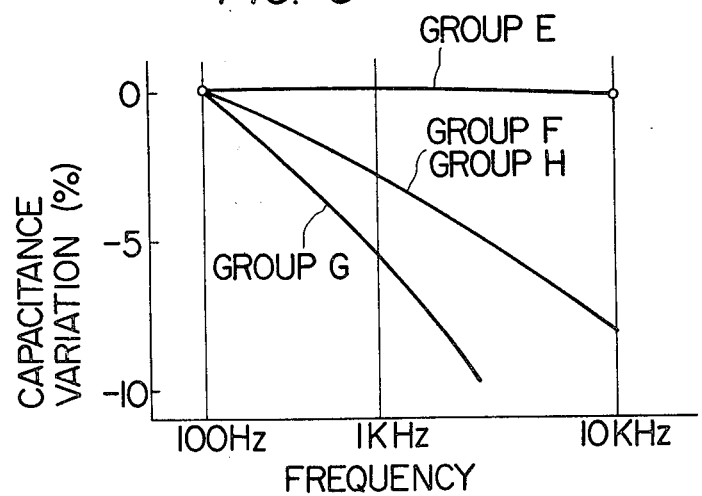

SOLID ELECTROLYTE COMPACITOR USING LOW RESISTIVITY METAL OXIDE AS CATHODE COLLECTOR

BACKGROUND OF THE INVENTION

This invention relates to a solid electrolyte capacitor of the type having a dielectric oxide film formed on the surface of an anode body of a valve metal, a metal oxide electrolyte layer covering the dielectric oxide film and a cathode collector layer covering the electrolyte layer, and more particularly to the material and construction of the cathode collector layer.

A solid electrolyte capacitor of the above described type is quite popular. Usually tantalum or aluminum is used as the anode material, and the dielectric oxide film is formed by anodization of an anode body which may take the form of a sintered mass, plate, rod, foil or a thin film deposited on a substrate. Manganese dioxide is predominant as a semiconductive metal oxide serving as the solid electrolyte but lead dioxide too is of use. As the most familiar construction of the cathode side of this capacitor, a layer of colloidal carbon or graphite is formed on the solid electrolyte layer to serve as a cathode collector usually by the use of an aqueous dispersion of colloidal graphite, and the carbon layer is covered with a conductive layer of a two-layered structure produced by first applying a silver paint and, after drying of the paint, performing a solder coating.

Considering the role of the carbon layer as a charge collector in this capacitor, it is desired that the contact of the carbon layer with the solid electrolyte layer be as intimate as possible since, as can be predicted, the intimateness of the contact greatly influences important characteristics, particularly tan δ of the capacitor. When the contact is not realized with a sufficiently low contact resistance, there occurs a considerable increase in tan δ, a loss relating to series resistance in the capacitor.

However, it is a regrettable fact that the conventional cathode collector layer given by the application of colloidal carbon is far from ideal either in the intimateness of its contact with the solid electrolyte layer or the resistance of itself. Since the carbon layer is made up of carbon particles which are roughly spherical and have usually a mean particle size of about 1 μm, the contact between the carbon layer and the electrolyte layer is established actually by a nearly point-to-point contact of the individual carbon particles with the surface of the electrolyte layer, resulting in that a considerable area of the electrolyte layer surface is left uncovered if viewed microscopically. The carbon particles contact with each other, but each contact area is also a very small one. The insufficiency of covering of the electrolyte layer surface with carbon particles and the smallness of actual contact area are augmented by another fact that a manganese dioxide layer, which is most widely used as the solid electrolyte layer, has usually a porous structure with a microscopically uneven or rugged surface.

Researches have been continued after a method of forming a manganese dioxide layer with an excellent smoothness of the surface to realize a better contact of the carbon layer with the solid electrolyte layer but have not yet been fruitful from the industrial viewpoint. Even when success is attained, an improvement by this method on the electrical contact will have a limit. As an alternative way, it has been proposed to polish, for example by sand blasting, the surface of a porous manganese dioxide layer formed by a conventional pyrolysis method in order to obtain a smooth surface. However, this method too cannot solve the problem completely and, besides, has the disadvantage that a mechanical stress cast on the capacitor element during the polishing process tends to cause deterioration of the dielectric oxide film and as the result an increased leakage current and/or lowered breakdown voltage of the capacitor.

Colloidal carbon has been preferred as the material of the cathode collector layer because of being considered to fairly well satisfy the requirements to be able to permeate into and firmly adhere to a porous structure such as a manganese dioxide layer given by thermal decomposition of a manganese nitrate solution, to retain the form of fine particles after processed to give a cathode collector layer, to be good at electric conductivity and to be inexpensive. Besides, a cathode collector layer of colloidal carbon can be produced without the need of such intense heating as will cause deterioration of the solid electrolyte layer.

Some metals such as silver, copper and gold are available in a colloidal form with good permeation ability. These colloidal metals are superior to colloidal carbon in electric conductivity but as a disadvantage they are relatively large in mean particle side, i.e. several microns, compared with about one micron of colloidal carbon. Besides, these colloidal metals are far expensive than colloidal carbon.

SUMMARY OF THE INVENTION

It is an object of the present invention to provide a solid electrolyte capacitor which has a conventional solid electrolyte layer of a semiconductor metal oxide on an anodized valve metal anode and a novel cathode collector layer which is superior to a conventional carbon layer in electrical contact with the electrolyte layer.

It is another object of the invention to provide a solid electrolyte capacitor which has a conventional solid electrolyte layer as stated above but exhibits a smaller loss expressed by tan δ and an improved frequency-capacitance characteristic than conventional capacitors of an analoguous type.

It is a still another object of the invention to provide a solid electrolyte capacitor which has a conductive layer of a sprayed metal on the aforementioned novel cathode collector layer.

A solid electrolyte capacitor according to the invention is fundamentally of a known construction and has an anode body of a valve metal, a dielectric oxide film formed on the anode body by anodization, a solid electrolyte layer of a semiconductive metal oxide laid on the dielectric oxide film, and a cathode collector layer laid on the electrolyte layer. As an essential feature of this capacitor, the cathode collector layer comprises as a substantial material at least one low resistivity metal oxide selected from ruthenium oxide, rhodium oxide, palladium oxide, rhenium oxide, osmium oxide and iridium oxide.

The cathode collector layer according to the invention may comprise colloidal carbon either in the form of a single layer made up of the low resistivity metal oxide particles and carbon particles or in the form of a two-layered structure in which a low resistivity metal oxide layer is in direct contact with the solid electrolyte layer and is covered with a carbon layer.

Each of the low resistivity metal oxides can be deposited on the solid electrolyte layer as sub-micron particles by wetting the electrolyte layer, which may have been laid with a colloidal carbon layer, with an aqueous solution of a soluble salt such as chloride or nitrate of the metal and heating the wetted capacitor element to cause thermal decomposition of the solution.

From a practical viewpoint, it is most preferable to use ruthenium oxide alone among the above listed low resistivity metal oxides.

Either manganese dioxide or lead dioxide is of use as the material of the solid electrolyte layer. Besides, an oxide of ruthenium, rhodium, rhenium, osmium or iridium, and particularly ruthenium oxide, may be used either in place of or together with manganese dioxide as disclosed in our prior U.S. application Ser. No. 838,236 filed Sept. 30, 1977.

The cathode collector layer in a capacitor of the invention may be coated with silver paint with a solder coating thereon as in conventional manganese dioxide capacitors, but it is more preferable that the cathode collector layer is coated directly with a metal layer such as a copper layer which is formed by plasma spraying.

BRIEF DESCRIPTION OF THE DRAWINGS

FIG. 6 is a longitudinal sectional view of a solid electrolyte capacitor of the invention, showing the provision of a conductive layer of a sprayed metal on a cathode collector layer;

FIGS. 7-A, 7-B and 7-C show, in section, a multi-layered structure in the capacitor of FIG. 6 for three variations of the construction of the cathode collector layer, respectively; and FIG. 8 is a graph showing by way of example the frequency-capacitance characteristic of a capacitor according to the invention in comparison with capacitors not in accordance with the invention.

DESCRIPTION OF PREFERRED EMBODIMENTS

We have recognized that a group of metal oxides, namely, ruthenium oxide, rhodium oxide, palladium oxide, rhenium oxide, osmium oxide and iridium oxide are sufficiently low in resistivity to use as a cathode collector material in a solid electrolyte capacitor. Despite being oxides, they are almost comparable to metals in electric conductivity since their specific conductance $\sigma$ ranges from $10^{-1}$ to $10^6$ ℧ $cm^{-1}$. Further, we have discovered that an excellent cathode collector layer can be produced by the use of any of these low resistivity metal oxides since these oxides can be deposited as very fine particles smaller than 1 $\mu m$ in mean particle size by thermal decomposition of the nitrates, chlorides or oxalates of the corresponding metals with the ability of permeating into and adhering to a porous manganese dioxide layer. Usually these metal oxides will be used singularly, but it is also possible to use two or more of them in various combinations. Among these low resistivity metal oxides, we prefer the use of ruthenium oxide $RuO_2$ because of its relatively low resistivity, less expensiveness than the others and ease of performing the aforementioned thermal decomposition. The resistivity $\rho$ of ruthenium oxide in the form of a thin layer deposited on a substrate depends on the deposition method but generally ranges from $10^{-5}$ to $10^{-2}$ $\Omega cm$. In the description hereinafter, the above listed low resistivity metal oxides will be represented by ruthenium oxide.

Figure 1:
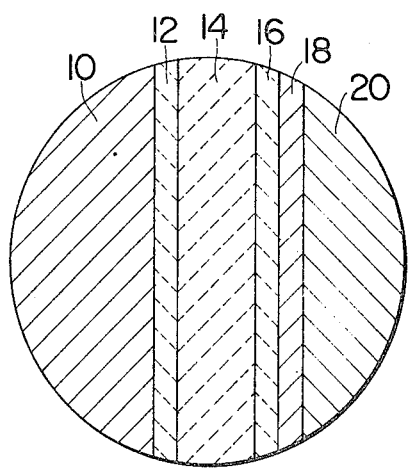
FIG. 1 is an enlarged sectional view of a fundamental part of a solid electrolyte capacitor according to the invention.

FIG. 1 shows a general construction of a solid electrolyte capacitor according to the invention. Indicated at 10 is an anode member of a valve metal such as tantalum or aluminum and at 12 is a dielectric oxide film formed on the surface of the anode 10 by a known anodization process. The anode member 10 may take the form of a rod, plate, sintered mass, foil or a thin film deposited on a substrate of a different material. A manganese dioxide layer 14 which serves as a solid electrolyte is formed on the dielectric oxide film 12 usually by pyrolysis of a manganese nitrate solution. The solid electrolyte layer 14 is laid intimately with a cathode collector layer 16 according to the invention, and the collector layer 16 is coated with a conductive layer 18 which is formed in this case by the application of a conventional silver paint. A solder coating 20 is made on the outside of the silver paint layer 18.

Figure 2:
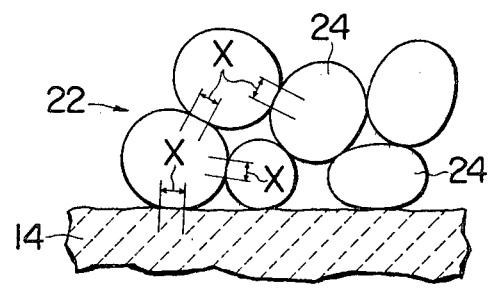
FIG. 2 shows the structure of a conventional cathode collector layer of carbon explanatorily and in great magnification.

Referring to FIG. 2, a conventional manganese dioxide capacitor of fundamentally the same construction has a carbon layer 22 as a cathode collector layer corresponding to the layer 16 in FIG. 1. As described hereinbefore, the carbon layer 22 is an accumulation of colloidal carbon particles 24. A real contact of the individual carbon particles 24 with either the solid electrolyte layer 14 or each other is established with a very small contact area indicated at X. As the result, a large area of the surface of the solid electrolyte layer 14 is left uncovered, and the carbon layer 22 has voids considerably large in total volume.

Figure 3:
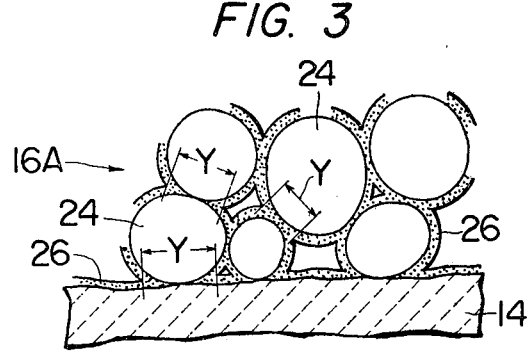
FIG. 3 shows the structure of a cathode collector layer as an embodiment of the invention also explanatorily and in great magnification.

As a first embodiment of the cathode collector layer 16 in the capacitor of FIG. 1, a cathode collector layer 16A shown in FIG. 3 utilizes colloidal carbon together with ruthenium oxide. This layer 16A is produced by first applying colloidal carbon or graphite to the surface of the solid electrolyte layer 14 so as to produce a carbon layer similar to the layer 22 in FIG. 2, then wetting the carbon-coated solid electrolyte layer 14 with an aqueous solution of a soluble and thermally decomposable ruthenium salt such as ruthenium trichloride or ruthenium nitrate and heating the wetted element to cause thermal decomposition of the salt into ruthenium oxide. Since ruthenium oxide is deposited by this method as sub-micron particles, gaps and voids in the carbon layer are filled up with the ruthenium oxide particles. In other words, the individual carbon particles 24 are coated with a ruthenium oxide layer 26, and the solid electrolyte layer 14 too is covered intimately with this layer 26 in areas not covered with the carbon particles 24. As the result, the contact of the individual carbon particles 24 with either the electrolyte layer 14 or each other is established with a contact area Y far larger than the contact area X in the case of the conventional cathode collector layer 22 of carbon alone. Because of extreme fineness of the ruthenium oxide particles (this leads to high denseness of the ruthenium oxide layer 26) and good conductivity of these particles, the cathode collector layer 16A is far superior to the conventional carbon layer 22 in electrical contact with the solid electrolyte layer 14, so that the capacitor of the invention exhibits improved characteristics, particularly in respects of tan δ and variation of capacitance with frequency.

Figure 4:
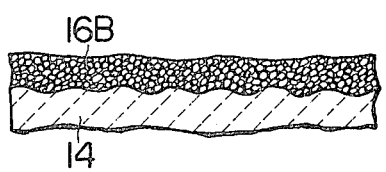
FIGS. 4 and 5 are sectional views showing respectively two differently constructed cathode collector layers as other embodiments of the invention.

As a second embodiment of the cathode collector layer 16 in FIG. 1, FIG. 4 shows a ruthenium oxide layer 16B which does not comprise carbon and is formed directly on the surface of the solid electrolyte layer 14. This ruthenium oxide layer 16B is a dense accumulation of very fine particles of ruthenium oxide formed by wetting the solid electrolyte layer 14 with an aqueous solution of a ruthenium salt of the aforementioned type and then heating the wetted electrolyte layer 14 to perform pyrolysis of the adhered solution. Since the solution soaks into a porous structure of the manganese dioxide layer 14 and ruthenium oxide is formed as sub-micron particles, the surface of the manganese dioxide layer 14 is covered intimately with the ruthenium oxide layer 16B even when the surface is minutely rugged or undulated and micro-pores in a surface regions of the electrolyte layer 14 is filled up with ruthenium oxide particles. Accordingly this ruthenium oxide layer 16B serves as an excellent cathode collector.

Figure 5:
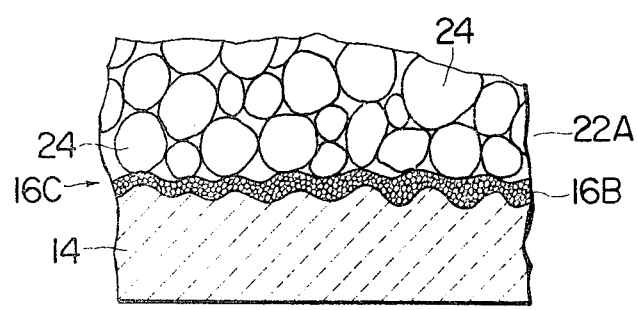

As a third embodiment, the cathode collector layer 16 of the invention may have a two-layered structure as shown in FIG. 5. A cathode collector layer 16C of this structure consists of the ruthenium oxide layer 16B, which is formed directly on the surface of the solid electrolyte layer 14 by the above described wetting and thermal decomposition procedures, and a colloidal carbon layer 22A which corresponds to the conventional carbon layer 22 in FIG. 2 but is formed on the surface of the ruthenium oxide layer 16B. The carbon layer 22A is formed by a conventional method for the carbon layer 22 in FIG. 2 such as the application of an aqueous dispersion of colloidal graphite to the surface of the ruthenium oxide layer 16B, followed by drying.

The ruthenium oxide layer 16B also in this case makes an intimate contact with the electrolyte layer 14. The manner of contact of the carbon layer 22A with the ruthenium oxide layer 16B is almost similar to that of the carbon layer 22 with the electrolyte layer 14 in FIG. 2. However, there is established a sufficiently good electrical contact between the carbon layer 22A and the electrolyte layer 14 because of a higher conductivity of the ruthenium oxide layer 16B than that of the manganese dioxide layer 14 and an excellent contact of the ruthenium oxide layer 16B with the manganese dioxide layer 14.

Either of the cathode collector layers 16B of FIG. 4 and 16C of FIG. 5 brings about a decrease in tan δ and an improvement in the frequency-capacitance characteristic of the capacitor.

The cathode collector layers 16A and 16C comprise carbon partly from the viewpoint of production cost but exhibits an improved contact with the manganese dioxide layer 14 from the following reasons other than the fineness of the ruthenium oxide particles. In the case of the conventional cathode collector layer 22 carbon particles 24 are required of electrically contacting the manganese dioxide 14. Since carbon and manganese dioxide are utterly different type of materials, they are not so affinitive with each other and hence there is a limit to the electrical contact between them. On the other hand, ruthenium oxide is rather analogous to manganese dioxide in being a metal oxide. Accordingly ruthenium oxide exhibits a higher affinity or stronger contact with manganese dioxide than carbon does. A really good electrical contact, therefore, can be established between ruthenium oxide and manganese dioxide or lead dioxide. Besides, the contact of ruthenium oxide in fine particle form with carbon particles 24, which are solid bodies, is distincly better than the contact of the carbon particles 24 with a porous structure of the manganese dioxide layer 14 either mechanically or electrically.

The cathode collector layer 16 must be coated with a highly conductive layer, i.e. a metallic layer. In the solid electrolyte capacitor of FIG. 1, the silver paint layer 18 serves as such a conductive layer. However, silver paint which is a dense dispersion of fine silver particles in an organic binder has a shortcoming, apart from its expensiveness, as a conductor material in the capacitor. When a casingless solid electrolyte capacitor having a cathode conductor layer of silver paint is kept in a high humidity atmosphere such as an 85° C.-95% RH atmosphere, there occur permeation of vapor through the silver paint layer and diffusion of the silver particles, carried by the vapor, from the organic binder matrix into the interior of the porous manganese dioxide layer and even to the dielectric oxide film, resulting in an increase in leakage current and ultimately breakdown of the capacitor by short circuit. That is to say, the silver paint layer is rather weak to humidity. Recently there is an increasing demand for casingless capacitors such as tip capacitors which are fully practicalbe in high-temperature high-humidity environments. At present, a protective coating of a humidity-resistant resin is applied to the silver paint layer in such capacitors.

To solve this problem, it has been proposed to replace the silver paint layer by a metal layer formed by a high temperature spraying technique such as plasma spraying. This method is highly effective for precluding deterioration of the capacitor by humidity but involves a problem that the provision of the sprayed-metal layer on the cathode collector layer of carbon tends to cause separation of the carbon layer from the solid electrolyte layer.

We have confirmed that the replacement of the silver paint layer 18 by a sprayed-metal layer in a capacitor of the invention is not accompanied with any unfavorable phenomenon in the essential part of the capacitor, i.e. a multi-layered structure constituted of the anode 10, dielectric oxide film 12, solid electrolyte layer 14 and cathode collector layer 16.

FIG. 6 shows a solid electrolyte capacitor which is constructed fundamentally as shown in FIG. 1 but has a conductive layer 30 of a sprayed-metal interposed between the cathode collector layer 16 and the solder coating 20 in place of the silver paint layer 18 in FIG. 1. Indicated at 32 is an anode lead attached to the anode body 10 of a cylindrical shape. The cathode collector layer 16 in this capacitor may be any of the hereinbefore described three variations 16A, 16B and 16C as illustrated respectively in FIGS. 7-A, 7-B and 7-C. The metal layer 30 is formed by a known metal spraying technique after completion of the production of the cathode collector layer 16 by any of the hereinbefore described methods. Various metals suitable for spraying such as copper, tin, aluminum, lead, nickel and silver, including their alloys, are of use for forming the conductive layer 30, but copper, aluminum and their alloys are most preferred with consideration of the cost and adaptability to spraying onto a capacitor element. Either arc spraying or plasma spraying may be employed for providing the conductive layer 30, but a capacitor of the best quality is obtained by the employment of plasma spraying.

Since metal particles in the sprayed-metal layer 30 adhere with each other very firmly, there is no possibility that the metal particles deffuse into the solid electrolyte layer even though the capacitor is kept in a high-temperature high-humidity environment. Accordingly the capacitor of FIG. 6 does not exhibit an appreciable deterioration of its tan δ, impedance or leakage current when used in such an environment. In the case of FIG. 7-B, the sprayed-metal layer 30 makes an excellent and strong contact with the ruthenium oxide layer 16B which adheres firmly to the manganese dioxide layer 14. It will be apparent that in this case the provision of the sprayed-metal layer has no adverse effect on the contact of the cathode collector layer 16B with the electrolyte layer 14. Even in the case of FIG. 7-A where the cathode collector layer 16A comprises carbon, this layer 16A does not separate from the electrolyte layer 14 because the contact of the sprayed-metal layer 30 with the cathode collector layer 16A is established primarily by the contact of the metal 30 with the ruthenium oxide layer 26 (in FIG. 3), while the layer 16A makes a good contact with the electrolyte layer 14 as explained hereinbefore. In the case of FIG. 7-C the sprayed-metal layer 30 contacts solely with the carbon layer 22A. However, even in this case the sprayed-metal layer 30 can be provided without unfavorably influencing the contact of the cathode collector layer 16C with the electrolyte layer 14 because the contact of the carbon layer 22A with the ruthenium oxide layer 16B, which makes a firm contact with the electrolyte layer 14, is better than the contact of the carbon layer 22 in FIG. 2 with the electrolyte layer 14.

As an additional advantage of utilizing the sprayed-metal layer 30, particularly of copper or aluminum in place of the silver paint layer 18, a remarkable reduction of the production cost is realized.

The invention will be illustrated further by the following examples.

EXAMPLE 1

Anode bodies used in this example were of sintered tantalum and cylindrical in shape. A half of them were 3 gr each in weight and the other half 0.1 g each. The anode bodies of both sizes were anodized in a phosphoric acid solution at an anodizing voltage of 60 V to form a dielectric tantalum oxide film on each of them. A manganese dioxide layer was formed on the dielectric oxide film by wetting the anodized bodies with an aqueous manganese nitrate solution having a specific gravity of 1.6 and then heating the wetted bodies in air to accomplish pyrolysis of manganese nitrate into manganese dioxide. The wetting and the heating were repeated five times for the 3 g bodies and three times for the 0.1 g bodies. A number of capacitor elements thus prepared from the 3 g and 0.1 g anode bodies were divided respectively into four groups in order to try four different ways of forming a cathode collector layer on each element.

Group A:

First the manganese dioxide layer was coated with colloidal graphite ("AQUADAG" of Acheson Colloidal Corp.) and dried. The carbon-coated element was dipped in a 1 g/l solution of ruthenium trichloride so as to impregnate the carbon coating with the solution, and the wetted element was heated in air at 250°-300° C. to accomplish pyrolysis of the ruthenium trichloride into ruthenium oxide. As the result, ruthenium oxide covered the carbon layer and deposited on the surface of the manganese dioxide layer in areas not covered (in a microscopical sense) with the carbon. Thus a cathode collector layer as illustrated in FIG. 3 was formed on the capacitor elements of this group. A conventional silver paint was applied onto the surface of this cathode collector layer and the resultant silver layer was laid with a solder coating to serve together as a conductive layer.

Group B:

The capacitor element, with the manganese dioxide layer as an outermost layer, was dipped in a 1 g/l aqueous solution of ruthenium trichloride so as to impregnate the manganese dioxide layer with the solution, and the wetted element was heated in air at 250°-300° C. to form a ruthenium oxide layer through pyrolysis of the solution. In this case ruthenium oxide filled depressions on the surface of the manganese dioxide layer and permeated into micropores present in a surface region of the manganese dioxide layer. Thus the capacitor elements of this group were provided with a cathode collector layer as illustrated in FIG. 4. A conductive layere was formed on the ruthenium oxide layer by the sequential application of the silver paint and the solder in the same manner as done for Group A.

Group C:

A ruthenium oxide layer was formed on the manganese dioxide layer by the process applied to Group B and thereafter covered with a carbon layer by the use of AQUADAG, resulting in the formation of a cathode collector layer as illustrated in FIG. 5. The above described conductive layer (silver paint and solder) was formed on the carbon layer of this cathode collector layer.

Group D:

A conventional cathode collector layer consisting of carbon was formed on the manganese dioxide layer by the use of AQUADAG, and a conductive layer was formed by the above described process using silver paint and solder.

Characteristics of the four groups of solid electrolyte capacitors thus produced were found to be as presented in Table 1.

Table 1

| | Capacitance (μF) | tan δ (%) | Leakage Current at 16 V (μA) | Frequency-Capacitance Characteristic |
|---|---|---|---|---|
| Group A | | | | |
| 3 g body | 350 | 2-3 | 1.0 | good |
| 0.1 g body | 10 | 0.8 | 0.05 | good |
| Group B | | | | |
| 3 g body | 350 | 2-3 | 1.0 | good |
| 0.1 g body | 10 | 0.8 | 0.05 | good |
| Group C | | | | |
| 3 g body | 350 | 2-3 | 1.0 | good |
| 0.1 g body | 10 | 0.08 | 0.05 | good |
| Group D (prior art) | | | | |
| 3 g body | 350 | 5 | 1.0 | a little inferior at HF |
| 0.1 g body | 10 | 2 | 0.05 | " |

The experimental data in Table 1 demonstrate the superiority of the capacitors comprising a low resistivity metal oxide in their cathode collector layer to the conventional capacitors utilizing carbon alone as the cathode collector material in the dielectric loss and the frequency-capacitance characteristic.

EXAMPLE 2

The 3 g tantalum anode bodies used in Example 1 were anodized in accordance with Example 1, and then a manganese dioxide layer was formed on the dielectric oxide film of every anode body by the pyrolysis method described in Example 1. The thus prepared capacitor elements were divided into four groups, which were subjected respectively to the following procedures.

Group E:

The capacitor element was dipped in a 1 g/l aqueous solution of ruthenium trichloride, and the wetted element was heated in air at 250°–300° C. for about 10 min to complete the decomposition of ruthenium trichloride into ruthenium oxide, resulting in that the manganese dioxide layer was covered intimately with a ruthenium oxide layer such that depressions and pores in a surface region of the manganese dioxide layer were well filled up with ruthenium oxide. Then the ruthenium oxide layer was laid with a copper layer by plasma spraying of powdered copper utilizing argon gas for producing plasma jet. A cathode lead was attached to the copper layer. Thus this group gave capacitors of the construction as illustrated in FIG. 7-B.

Group F:

A conventional cathode collector layer consisting of carbon was formed on the manganese dioxide layer by the application of AQUADAG, and after drying a copper layer was formed on the carbon layer by the plasma spraying method applied to Group E, followed by the attachment of a cathode lead to the copper layer.

Group G:

The above described plasma spraying of copper was applied to the surface of the manganese dioxide layer, so that the manganese dioxide layer was laid with copper without the interposal of any intermediate layer.

Group H:

The manganese dioxide layer was covered with a carbon layer by the application of AQUADAG, followed by drying. Then a conventional conductive layer was formed on the carbon layer by the sequential application of silver paint and solder as in Example 1. Accordingly this group gave substantially the same capacitors as Group D in Example 1.

As can be understood, the capacitor elements of Group E were made into capacitors according to the invention, but those of Groups F, G and H were not processed according to the invention.

FIG. 8 shows frequency-capacitance characteristic of the four groups of solid electrolyte capacitors produced in this Example and Table 2 presents other characteristics of these capacitors.

Table 2

| | Capacitance ($\mu$F) | tan $\delta$ (%) | Leakage Current at 16 V ($\mu$A) | Humidity Resistance |
|---|---|---|---|---|
| Group E (Invention) | 350 | 2-3 | 1.0 | good |
| Group F | 350 | 2-3 | 1.0 | good |
| Group G | 350 | 10-20 | 1.0 | good |
| Group H (Prior art) | 350 | 5-6 | 1.0 | good |

Note: The capacitors of Group F exhibited the tendency to separation of the carbon layer from the manganese dioxide layer.

This example demonstrates advantages of employing a spraying-metal conductive layer in combination with a cathode collector layer comprising ruthenium oxide over other constructions in respect of the quality of the product. Besides, the capacitors of Group E could be produced at considerably lower cost than those of Group H owing to the replacement of silver by copper.

EXAMPLE 3

Using the 3 g tantalum anode bodies, the anodization to form a dielectric oxide film and the formation of a manganese dioxide layer were carried out in accordance with Example 2. The resultant capacitor elements were divided into three groups, which were subjected respectively to the following procedures.

Group I:

The capacitor element was dipped in an aqueous ruthenium nitrate solution containing $5\times10^{-3}$ gram-equivalent weights of $Ru^{3+}$ per liter, and the wetted element was heated in air at 250°–300° C. for about 10 min to complete the decomposition of ruthenium nitrate into ruthenium oxide thereby to form a ruthenium oxide layer on and in intimate contact with the manganese dioxide layer.

The use of ruthenium nitrate to form ruthenium oxide is considered to be more advantageous than the use of ruthenium trichloride because the presence of chlorine ion in the oxide is undesirable, but ruthenium nitrate is hardly avaiable on the commercial market in a stable form. In this case the ruthenium nitrate solution was prepared by adding an aqueous solution of silver nitrate to an aqueous ruthenium trichloride solution containing $5\times10^{-3}$ gram-equivalent weights of $Ru^{3+}$ per liter so as to nearly complete the formation of silver chloride and then separating the precipitated silver chloride by filtration.

Group J:

A ruthenium oxide layer was formed on the manganese dioxide layer by the method applied to Group I, but the ruthenium nitrate solution for this group was prepared by the following process.

To an aqueous ruthenium trichloride solution containing $5\times10^{-3}$ gram-equivalent weights of $Ru^{3+}$ per liter was added the same volume of concentrated nitric acid, and the mixture was boiled for more than 30 min with an intermittent supply of an additional and small amount of concentrated nitric acid. The boilding was terminated upon observation that the volume of the mixture reduced to the initial volume of the ruthenium trichloride solution. The resultant solution was used as the ruthenium nitrate solution.

Group K:

A carbon layer was formed on the manganese dioxide layer by the application of AQUADAG.

Thereafter the products of Groups I, J and K were all provided with a conductive layer by the sequential application of silver paint and solder. It will be understood that the capacitors of Group K had a conventional construction.

Characteristics of the three groups of solid electrolyte capacitors produced in this example are presented in Table 3.

Table 3

| | Capacitance (μF) | tan δ (%) | Leakage Current at 16 V (μA) | Frequency-Capacitance Characteristic |
|---|---|---|---|---|
| Group I | 350 | 2-3 | 1.0 | good |
| Group J | 350 | 2-3 | 1.0 | good |
| Group K (Prior art) | 350 | 5 | 1.0 | a little inferior at HF |

What is claimed is:

1. In a solid electrolyte capacitor having an anode body of a valve metal, a dielectric oxide film formed on the surface of the anode body by anodization, a solid electrolyte layer of a semiconductive metal oxide formed on the dielectric oxide film, and a cathode collector layer formed on the solid electrolyte layer, the improvement comprising said cathode collector layer comprising as a substantial material at least one low resistivity metal oxide selected from the group consisting of ruthenium oxide, rhodium oxide, palladium oxide, rhenium oxide, osmium oxide and iridium oxide.

2. A solid electrolyte capacitor as claimed in claim 1, wherein said cathode collector layer is a single layer constituted of carbon and said at least one low resistivity metal oxide.

3. A capacitor as claimed in claim 1, wherein said cathode collector layer consists of a first layer of said at least one low resistivity metal oxide formed on said solid electrolyte layer and a second layer of carbon in the form of fine particles formed on said first layer.

4. A capacitor as claimed in claim 1, wherein said cathode collector layer consists of said at least one low resistivity metal oxide.

5. A capacitor as claimed in claim 1, wherein said at least one low resistivity metal oxide in said cathode collector layer is formed by thermal decomposition of an aqueous solution of at least one metal salt selected from the chlorides and nitrates of ruthenium, rhodium, palladium, rhenium, osmium and iridium, said thermal decomposition being performed in a state of said solid electrolyte layer being wetted with said aqueous solution.

6. A capacitor as claimed in claim 1, wherein said at least one low resistivity metal oxide is ruthenium oxide alone.

7. A capacitor as claimed in claim 6, wherein said semiconductive metal oxide is manganese dioxide.

8. A capacitor as claimed in claim 1, further comprising a conductive layer which is a coating of a sprayed metal on said cathode collector layer.

9. A capacitor as claimed in claim 8, wherein said conductive layer is of a metal selected from the group consisting of copper, tin, nickel, alumium, lead and silver, including alloys thereof, formed by plasma spraying.

10. A capacitor as claimed in claim 8, wherein said conductive layer is of copper formed by plasma spraying.

11. A capacitor as claimed in claim 10, wherein said at least one low resistivity metal oxide is ruthenium oxide alone.

12. A capacitor as claimed in claim 11, wherein said cathode collector layer consists of ruthenium oxide, said solid electrolyte layer being of manganese dioxide.

13. A capacitor as claimed in claim 1, further comprising a conductive layer consisting of a first layer which comprises fine particles of silver and is formed on said solid electrolyte layer and a second layer of a solder coated on said first layer.

14. In a solid electrolyte capacitor having an anode body of a valve metal, a dielectric oxide film formed on the surface of the anode body by anodization, a microscopically porous manganese dioxide layer formed on the dielectric oxide film, and a cathode collector layer formed on the manganese dioxide layer, the improvement comprising said cathode collector layer being essentially fine particles of ruthenium oxide.

15. A capacitor according to claim 14, further comprising a conductive metal layer formed by plasma spraying on said cathode collector layer.

16. In a solid electrolyte capacitor having an anode body of a valve metal, a dielectric oxide film formed on the surface of the anode body by anodization, a microscopically porous manganese dioxide layer formed on the dielectric oxide film, and a cathode collector layer formed on the manganese dioxide layer, the improvement comprising said cathode collector layer being essentially a mixture of fine particles of carbon and fine particles of ruthenium oxide.

17. A capacitor according to claim 16, further comprising a conductive metal layer formed by plasma spraying on said cathode collector layer.

18. In a solid electrolyte capacitor having an anode body of a valve metal, a dielectric oxide film formed on the surface of the anode body by anodization, a microscopically porous manganese dioxide layer formed on the dielectric oxide film, and a cathode collector layer formed on the manganese dioxide layer, the improvement comprising said cathode collector layer being made up of a first layer which is essentially fine particles of ruthenium oxide and which is formed directly on said manganese dioxide layer, and a second layer which is essentially fine particles of carbon and which is formed on said first layer.

19. A capacitor according to claim 18, further comprising a conductive metal layer formed by plasma spraying on said cathode collector layer.

* * * * *